Patented June 26, 1934

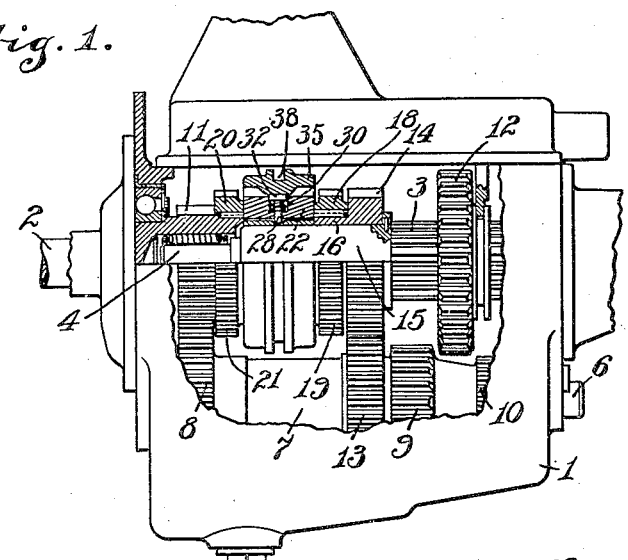
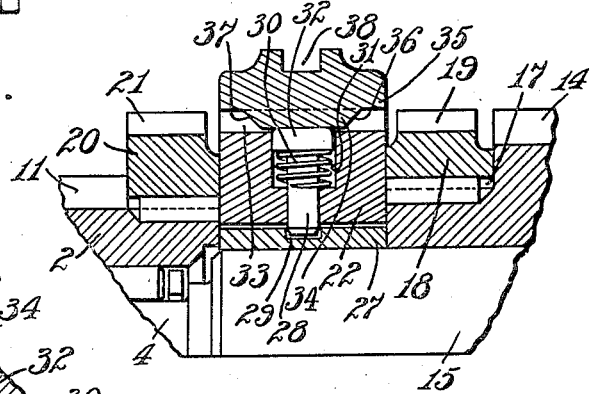
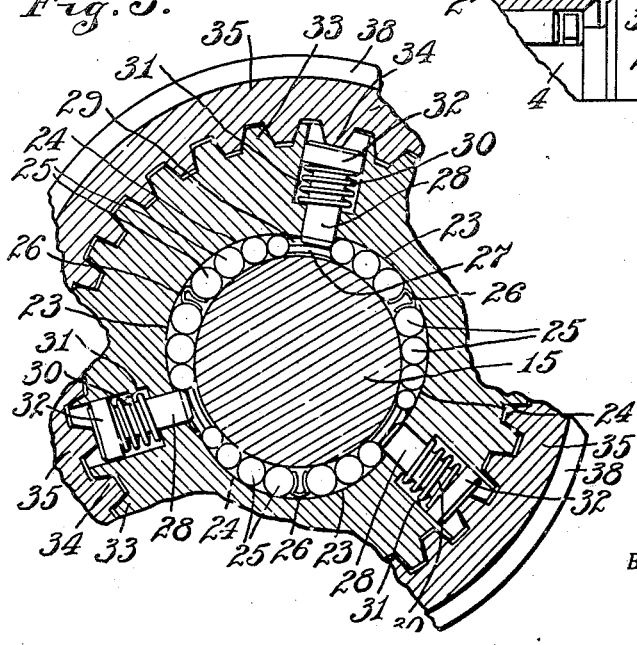

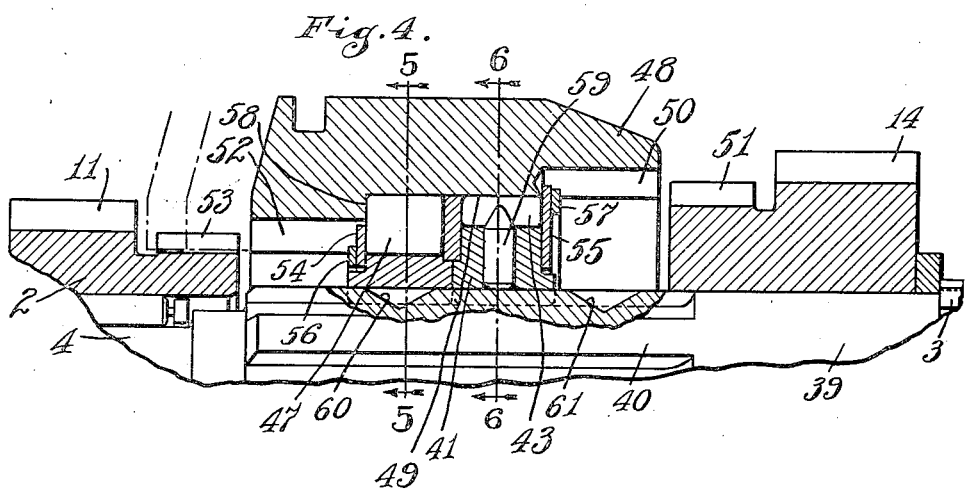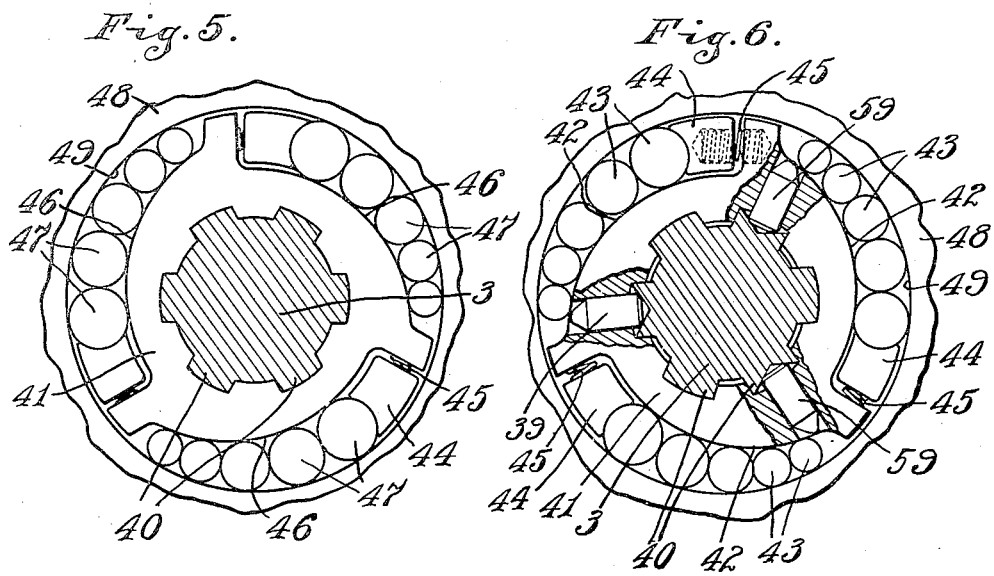

1,964,146

UNITED STATES PATENT OFFICE 1,964,146

CLUTCHING MECHANISM

Otto E. Fishburn and Henry H. Robbins, Muncie, Ind., assignors, by mesne assignments, to Free Wheeling Patents Corporation, South Bend, Ind., a corporation of Delaware Application January 5, 1931, Serial No. 506,710

10 Claims. (Cl. 192—48)

Our invention relates to improvements in clutching mechanism particularly adapted for that type of automobile transmission which has now become commercially known as the "free wheeling type". It is one of the objects of our invention to provide an improved form of clutch mechanism which may be operated to connect either of two driving members, preferably the high speed drive and the second speed drive with the driven shaft, said mechanism being so arranged that either of said driving members will drive the driven member through a one-way clutch or through a two-way clutch, a single operating means preferably being provided for accomplishing this result in a simple and expeditious manner.

It is one of the objects of our invention to provide an improved form of transmission of the above type and more particularly, it is one of the objects of our invention to provide an improved clutching mechanism for a transmission of the above type whereby the transmission may be locked up to render the free wheeling mechanism inoperative.

For the purpose of disclosing our invention we have disclosed one embodiment thereof in the accompanying drawings, in which:

Fig. 1 is a side elevation partially in section of a transmission embodying our invention;

Fig. 2 is a longitudinal detailed section of our free wheeling mechanism;

Fig. 3 is a transverse sectional view showing our free wheeling clutch;

Fig. 4 is a detail section showing a modification of our invention;

Fig. 5 is a sectional view on the line 5—5 of Fig. 4, and

Fig. 6 is a sectional view on the line 6—6 of Fig. 4.

In the embodiment illustrated the usual transmission housing 1 is provided, into one end of which projects the driving shaft 2 and into the opposite end of which projects the driven shaft 3, the reduced end of this shaft being piloted as at 4 in the driving shaft 2.

Beneath the driving and driven shafts is located a countershaft 6 having rotatably mounted thereon a spindle 7 provided with gears 8, 9 and 10. The gear 8 is in constant mesh with and driven from a gear 11 on the driving shaft 2. The gear 9 is adapted to be meshed with a sliding gear 12 splined on the shaft 3 and this gear 12 is likewise adapted to mesh with an idler gear (not shown), in turn meshing with the gear 10 for reverse drive, the drive through the gears 9 and 12 being the low speed drive.

For second speed drive we provide a gear 13 on the spindle 7 which is adapted to mesh with a gear 14 normally rotatable on the barrel 15 of the shaft 3. The hub of the gear 14 is provided with an extension 16 having peripheral teeth adapted to be meshed with the inner peripheral teeth 17 on a ring 18, the outer periphery of which is provided with clutch teeth 19. A similar ring 20 is mounted on the end of the shaft 2 and is provided with clutch teeth 21.

A hub 22 surrounds the barrel 15 and comprises the outer member of a roller clutch, the inner member of which is formed by the barrel 15. The inner face of the clutch member 22 is provided with a series of cammed surfaces 23 eccentric to the axis of the barrel 15 and inclined toward the barrel in one direction. A similar series of eccentric surfaces 24 extending in the opposite direction is also provided on the inner surface of the member 22, the arrangement being such that portions of the opposite sets of surfaces nearer to the barrel portion are in juxtaposition. A series of rollers 25 is interposed between each of the eccentric surfaces and the barrel 15 and these rollers, it will be noted, decrease in diameter, the rollers being biased toward the narrower portion of their recesses by suitable springs 26 interposed between the base rollers of the sets and the sets of rollers are maintained separated by spacer blocks 27 interposed between the sets, the blocks being arcuate to conform to the shape of the barrel 15. For blocking the movement of the sets of rollers controlling the clutching of the outer and inner members of the clutch in one direction, I provide a plurality of radially movable pins, one for each set of rollers, 28, which pins are tapered on their ends and take into slots 29 in the spacer members 27. These pins are biased toward their outer position by coiled springs 30 interposed between the bottoms of the recesses 31, in which the pins operate, and the heads 32 of the pins.

The outer periphery of the clutch member 22 is toothed as at 33 and surrounding this clutch member and provided with teeth 34, meshing with the teeth 33, is a shift ring 35. Certain of the teeth of this ring bear upon the heads 32 of the pins 28 to maintain them depressed or in their inner position. The edges of these teeth are cut off as at 36 and 37 to leave only a central portion of the tooth so that, when the ring is shifted to the right or to the left to permit the center portions of the teeth to clear the pins, the pins will be moved radially outward or in unblocking position by the coiled springs 30. The length of the holding portion of the teeth is such that the member 35 may be shifted to the right or left to engage the teeth 34 with the teeth 19 or 21 without permitting the pins to be moved radially outward, although a continued movement in this engaging direction will release the pins.

This shift member or ring 35 is provided with an annular groove 38 adapted to receive the shifting fork operated by the usual shift lever of the transmission. In operation, when it is desired to drive the shaft 3 at second speed with the free wheeling clutch operating, it being understood that the shift member 35 normally occupies a middle position between the teeth 19 and 21, the shift ring 35 is shifted to the right looking at Figs. 1 and 2 to cause the teeth 34 to mesh with the teeth 19. This movement, however, is not sufficiently far to release the pins 28. Accordingly the pins 28 are in the path of the rollers cooperating with the surfaces 23, thereby preventing the movement of these rollers toward locking position, but permitting the movement of the rollers cooperating with the surfaces 24, due to the clearance of the last roller of each of the series of rollers and the pins 28. Under these circumstances, the clutch surfaces 24 and the associated rollers operate as an overrunning clutch. When there is a relative movement between the outer member 22 and the inner member 15 of the clutch with the outer member rotating in a clockwise direction, looking at Fig. 3, the rollers will tend to lock the two members together, thereby causing the shaft 3 to be driven from the gear 14, the outer member having been connected to the gear by the shift member 35. If, however, the shaft 3 and the inner member 15 of the clutch rotate in a clockwise direction faster than the outer member 22, the rollers cooperating with the surfaces 24 are released and due to the fact that the rollers cooperating with the surfaces 23 cannot move into clutching position, being stopped by the pins 28, the shafts will be disconnected. A continued movement of the shifting ring 35 to the right looking at Fig. 1 will release the pins 28 permitting the coiled springs 30 to shift them out of the path of the stop rollers so that, both sets of roller clutches will be rendered operative and therefore the clutching members will be connected together irrespective of the direction of rotation and the shaft 3 driven at second speed with the overrunning clutch arrangement, "locked out".

A shift of the shift ring 35 to the left meshing the teeth 34 with the teeth 21 will connect the shaft directly in the same manner as heretofore described with respect to the connection of the gear 14 to the shaft 3.

In Figs. 4, 5 and 6 we have illustrated a modification of our invention. In the structure therein illustrated the shaft 3 beyond the portion 39 on which the gear 14 is rotatably mounted, has a series of splines 40 formed thereon. A hub 41 is rotatably connected with the shaft 3 by means of these splines while being axially shiftable on the shaft. This hub is provided with a series of cam surfaces 42 inclined away from the axis of the shaft 3 in one direction, each receiving a series of rollers 43 biased toward the narrower portion of the surface or recess by means of blocks 44 and coiled springs 45. A second set of cammed surfaces 46 is formed on the hub member 41 extending in the opposite direction, each set being adapted to receive the rollers 47. It will be noted that the rollers of each set gradually decrease in diameter. Surrounding the rollers and hub 41 which constitute an inner clutch member is an outer clutch member 48 having an inner surface 49 cooperating with the rollers 43 and 47. This outer clutch member is provided with a set of internal teeth 50 adapted, when the clutch member is shifted in one direction, to mesh with the teeth 51 corresponding to the teeth 19, and with a second set of teeth 52 adapted when the clutch is shifted in the opposite direction to mesh with the teeth 53, corresponding to the teeth 21.

The rollers 43 and 47 are held against longitudinal displacement by rings 54 and 55 which are maintained in position by snap rings 56 and 57. The outer clutch member 48 has a shoulder 58 bearing against the sides of the rollers 47 and the ring 55 is secured to the outer member 48 by the snap ring 57 so that, when the member 48 is shifted axially, the inner clutch member will be moved therewith.

The operation of the sets of rollers 43 is controlled by radially extending pins 59 arranged to extend through the hub member 41 and when in their projected position, into the path of the sets of rollers 43 thereby preventing movement of these rollers. These pins are normally maintained in their projected position by their engagement, at their inner ends, with the tops of the splines 40, on which they rest. These splines, however, are provided with recesses 60 and 61 into which the pins may drop at certain axial positions of the clutch members on the shaft 3.

The cam surfaces 46 extend in the opposite directions to the opposite cam surfaces with which the rollers 43 cooperate so that, when both sets of rollers are operating the clutch operates as a bidirectional clutch. This occurs when the pins 59 drop into the recesses 60 and 61. When the pins 59, however, extend into the path of the sets of rollers 43 rendering these rollers inoperative, the clutch operates as a unidirectional clutch.

In operation, when it is desired to drive the shaft 3 at second speed, through the gear 14 the member 48 is shifted axially to engage the teeth 50 and 51, without, however, moving the parts sufficiently far to permit the pins 59 to drop into the recesses 61. The gear 14 is thus connected with the shaft 3 by means of a unidirectional overrunning clutch, due to the fact that the rollers 43 are inoperative. A continued movement in the same direction of the member 48, however, while still maintaining the teeth 50 and 51 in engagement permits the pins 59 to drop into their recesses 61, thereby withdrawing the pins from the paths of the sets of rollers 43, permitting them to operate, and the gear is connected to the shaft by a bidirectional clutching mechanism. The connection of the shafts 2 and 3 direct is effected in the same manner by shifting the clutching mechanism axially in the opposite direction to engage the clutch teeth 52 and 53.

We claim as our invention:

1. In a device of the character described, the combination with driving and driven members, of a coupling for said members comprising an abutment member and a cammed member having oppositely disposed cammed surfaces and gripping members in the form of rollers cooperating therewith, to act as bidirectional clutches, radially movable members in the path of the rollers of one cammed surface to prevent the operation thereof and cause the coupling members to act as a unidirectional clutch and axially shiftable means surrounding said coupling for causing the withdrawal of said preventing means to permit said coupling to act as a bidirectional clutch.

2. In a device of the character described, the combination with driving and driven members, of a coupling for said members comprising an abutment member, a cammed member having oppositely disposed cammed surfaces and gripping members in the form of rollers cooperating therewith to act as bidirectional clutches, means in the path of the rollers of one cammed surface to prevent the operation thereof and cause the coupling members to act as a unidirectional clutch and axially shiftable means for connecting a member of the coupling with the driving member.

3. In a device of the character described, the combination with driving and driven members, of a coupling for said members comprising an abutment member, a cammed member having oppositely disposed cammed surfaces and gripping members in the form of rollers cooperating therewith to act as bidirectional clutches, means in the path of the rollers of one cammed surface to prevent the operation thereof and cause said coupling members to act as a unidirectional clutch, and axially shiftable means to control the withdrawal of said preventer means and for connecting a coupling member with the driving member.

4. A clutch device for connecting either of a pair of driving members with a driven member, comprising an abutment member, a cammed member having oppositely disposed cammed surfaces and gripping members in the form of rollers cooperating therewith to act as bidirectional clutches, means in the path of the rollers of one cammed surface to prevent the operation thereof and cause said clutch device to act as a unidirectional clutch and a single axially shiftable member for connecting one of the clutch members with either of the driving members and for causing the withdrawal of the preventer means to permit said clutch device to operate as a bidirectional clutch.

5. A clutch device for coupling either of a pair of driving members with a driven member, comprising two unidirectional clutches acting in opposition to one another, means for rendering one of said clutches inoperative to cause said clutch device to act as a unidirectional clutch and a shiftable member for connecting said clutch device with either of said driving members.

6. A clutch device for connecting either of a pair of driving members with a driven member, comprising a pair of oppositely disposed unidirectional clutches, and a single axially shiftable means for connecting one of the members of said clutch device with either of said driving members while maintaining one of said clutches inoperative.

7. A clutch device for connecting either of a pair of driving members with a driven member, comprising a pair of unidirectional clutches oppositely disposed to act as a bidirectional clutch, means for rendering one of said unidirectional clutches inoperative, and a single axially shiftable means for connecting one of the members of said clutch device to either of said driving members and simultaneously rendering said inoperative unidirectional clutch operative.

8. A coupling for connecting either of two driving members with a driven member, comprising a pair of unidirectional clutches oppositely disposed to operate as a bidirectional clutch, means normally preventing the operation of one of said clutches to cause the coupling to operate as a unidirectional clutch, an axially shiftable member for connecting one of the members of said coupling to either of said driving members, said member maintaining said preventing means in position during a portion of its connecting movement while permitting a withdrawal of the same during a further portion of its connecting movement.

9. A coupling for connecting either of two driving members with a driven member, comprising a pair of unidirectional clutches oppositely disposed to cause said coupling to operate as a bidirectional clutch and including an outer member, means in said outer member for preventing the operation of one of said unidirectional clutches, and an axially shiftable member normally maintaining said preventer means in operative position and having means for connecting said outer member to either of said driving members, said member during a portion of its connecting movement maintaining said preventer in operation while a continued shift of said member in its connecting direction renders said preventer means inoperative whereby the coupling member will operate as a bidirectional clutch.

10. A clutch device for use in a transmission including a driving shaft, a driven shaft and a gear rotatably mounted on said driven shaft and driven from said driving shaft, comprising a pair of unidirectional clutches oppositely disposed to cause said clutch device to operate as a bidirectional clutch, means for preventing the operation of one of said unidirectional clutches and an axially shiftable member normally maintaining said preventer means in operative position and having means for connecting one of the members of said clutch device either to the gear or to the driving shaft, said member during a portion of its connecting movement maintaining said preventer in operation while a continued shift of said member in its connecting direction renders said preventer means inoperative whereby the coupling member will operate as a bidirectional clutch.

OTTO E. FISHBURN.
HENRY H. ROBBINS.